(12) United States Patent
   Miyata

(10) Patent No.: US 11,449,970 B2
(45) Date of Patent: Sep. 20, 2022

(54) THREE-DIMENSIONAL GEOMETRY MEASUREMENT APPARATUS AND THREE-DIMENSIONAL GEOMETRY MEASUREMENT METHOD

(71) Applicant: Mitutoyo Corporation, Kanagawa (JP)

(72) Inventor: Kaoru Miyata, Ibaraki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/151,403

(22) Filed: Jan. 18, 2021

(65) Prior Publication Data

US 2021/0224960 A1    Jul. 22, 2021

(30) Foreign Application Priority Data

Jan. 22, 2020    (JP) .............................. JP2020-008025

(51) Int. Cl.
| | | |
|---|---|---|
| H04N 7/18 | (2006.01) | |
| G06T 5/00 | (2006.01) | |
| G06T 7/73 | (2017.01) | |
| G06T 7/60 | (2017.01) | |
| G01B 11/24 | (2006.01) | |
| G06T 5/50 | (2006.01) | |
| G01B 11/00 | (2006.01) | |
| G06T 7/521 | (2017.01) | |

(52) U.S. Cl.
CPC ............ G06T 5/006 (2013.01); G01B 11/002 (2013.01); G01B 11/24 (2013.01); G06T 5/50 (2013.01); G06T 7/521 (2017.01); G06T 7/60 (2013.01); G06T 7/74 (2017.01)

(58) Field of Classification Search
CPC . G06T 2207/10016; G06T 2207/10028; G06T 2207/10068; G06T 7/55; G06T 7/579; G06T 15/00; G06T 2207/10048; G06T 2207/10088; G06T 2207/30068
USPC ........................................................ 348/136
See application file for complete search history.

(56) References Cited

U.S. PATENT DOCUMENTS

| | | | |
|---|---|---|---|
| 2015/0204662 A1* | 7/2015 | Kobayashi ............. | G01B 11/25 356/610 |
| 2020/0074655 A1* | 3/2020 | Sakamoto ................ | G06T 7/70 |

FOREIGN PATENT DOCUMENTS

JP    2017-207346    11/2017

* cited by examiner

*Primary Examiner* — Masum Billah
(74) *Attorney, Agent, or Firm* — Rankin, Hill & Clark LLP

(57) ABSTRACT

A three-dimensional geometry measurement apparatus including a virtual coordinate identification part that identifies coordinates of a virtual captured pixel corresponding to a feature point in an image plane of a capturing device by virtually projecting the feature point on a reference instrument onto the image plane: correction part that generates correction information for correcting coordinates of the measurement-target captured pixel included in a measurement-target captured image; and a geometry identification part that corrects coordinates of a plurality of the measurement-target captured pixels included in the measurement-target captured image generated by capturing an object to be measured with the capturing device on the basis of geometric property information and the correction information, and identifies a geometry of the object to be measured on the basis of measurement three-dimensional coordinates to be calculated based on the coordinates of the measurement-target captured pixels.

9 Claims, 14 Drawing Sheets

→ x

THREE-DIMENSIONAL GEOMETRY MEASUREMENT APPARATUS AND THREE-DIMENSIONAL GEOMETRY MEASUREMENT METHOD

CROSS-REFERENCE TO RELATED APPLICATIONS

The present application claims priority to Japanese Patent Application number 2020-008025, filed on Jan. 22, 2020. The contents of this application are incorporated herein by reference in their entirety.

BACKGROUND

The present disclosure relates to a three-dimensional geometry measurement apparatus and a three-dimensional geometry measurement method for measuring a three-dimensional geometry of an object to be measured.

A light-pattern projecting method uses the principle of triangulation and performs a three-dimensional (3D) geometry measurement by projecting a pattern of stripes from a projector onto an object to be measured, and then by capturing the pattern that changes in accordance with the geometry of the object to be measured with a camera. In the 3D geometry measurement, measurement accuracy may be reduced due to influences of distortion of an image caused by optical imperfections and the like of a capturing part or a projection part. Therefore, it is important to obtain the image distortion by capturing a reference instrument for a distortion correction to correct the image distortion. Japanese Unexamined Patent Application Publication No 2017-207346 describes correcting distortion of an image by capturing a calibration pattern on a reference instrument.

In the method described in Japanese Unexamined Patent Application Publication No 2017-207346, in order to ensure accuracy, a calibration is performed by radiating light having a specific wavelength. However, since the image distortion is complicated, there was an issue that it is difficult to ensure sufficient accuracy just with such a method.

SUMMARY

The present disclosure focuses on this point, and an object of the present disclosure is to provide a 3D geometry measurement apparatus and a 3D measurement method that are capable of performing more accurate measurement in dealing with complicated image distortion.

A 3D geometry measurement apparatus of the first aspect that includes a capturing device and measures a 3D geometry of an object to be measured on the basis of a measurement-target captured image obtained by capturing the object to be measured with the capturing device, the 3D geometry measurement apparatus including a reference coordinate identification part that identifies coordinates of a reference captured pixel corresponding to a feature point in a reference captured image generated by capturing a reference instrument having a plurality of the feature points with the capturing device; a virtual coordinate identification part that identifies coordinates of a virtual captured pixel corresponding to the feature point in an image plane of the capturing device by virtually projecting the feature point on the reference instrument onto the image plane using (i) geometric property information indicating geometric characteristics of the capturing devices and (ii) relative position and posture information between the capturing device and the reference instrument; a correction part that generates correction information for correcting coordinates of the measurement-target captured pixel included in the measurement-target captured image on the basis of a comparison between the coordinates of the reference captured pixel and the coordinates of the virtual captured pixel; and a geometry identification part that corrects coordinates of a plurality of the measurement-target captured pixels included in the measurement-target captured image generated by capturing the object to be measured with the capturing device on the basis of the geometric property information and the correction information, and identifies a geometry of the object to be measured on the basis of measurement 3D coordinates to be calculated based on the coordinates of the measurement-target captured pixels.

A 3D geometry measurement method of the second aspect is a 3D geometry measurement method for measuring a 3D geometry of an object to be measured on the basis of a measurement-target captured image obtained by capturing the object to be measured with the capturing device, including the steps of identifying coordinates of a reference captured pixel corresponding to a feature point in the reference captured image generated by capturing a reference instrument having a plurality of the feature points with the capturing devices, identifying coordinates of a virtual captured pixel corresponding to the feature point in an image plane of the capturing device by virtually projecting the feature point on the reference instrument onto the image plane using (i) geometric property information indicating geometric characteristics of the capturing devices and (ii) relative position and posture information between the capturing devices and the reference instrument, generating correction information for correcting coordinates of the measurement-target captured pixel included in the measurement-target captured image on the basis of a comparison between the coordinates of the reference captured pixel and the coordinates of the virtual captured pixel, and correcting coordinates of a plurality of the measurement-target captured pixels included in the measurement-target captured image generated by capturing the object to be measured with the capturing device on the basis of the geometric property information and the correction information to identify a geometry of the object to be measured on the basis of measurement 3D coordinates to be calculated based on the coordinates of the measurement-target captured pixels.

BRIEF DESCRIPTION OF THE DRAWINGS

FIGS. 1A to 10 illustrate an outline of a 3D geometry measurement apparatus according to the embodiment FIG. 2 shows a configuration of the 3D geometry measurement apparatus.

FIG. 4 shows how the reference instrument is measured.

FIG. 5 illustrates a method of identifying coordinates of a virtual captured pixel.

FIG. 6 shows an example of an error between a reference captured pixel (actual-measurement captured pixel) and the virtual captured pixel.

FIG. 9 shows examples of Gray codes corresponding to the binary stripe patterns.

FIG. 10 shows a relationship between absolute projection coordinates and relative projection coordinates.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of a Three-Dimensional (3D) Geometry Measurement Apparatus 100]

Figure 1A:
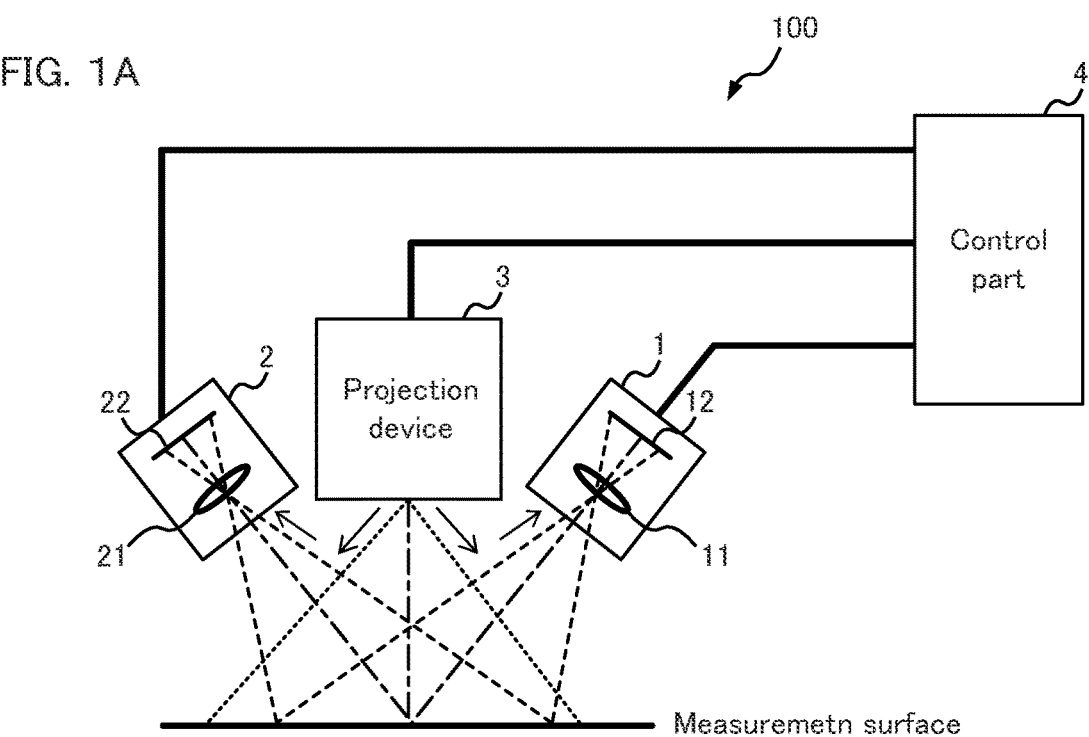
Figure 1B:
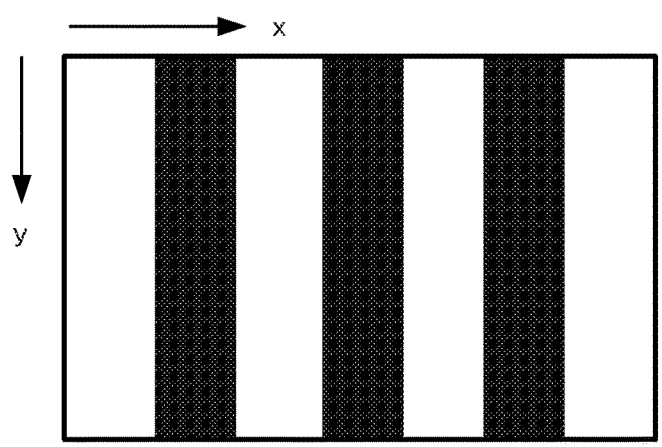
Figure 1C:
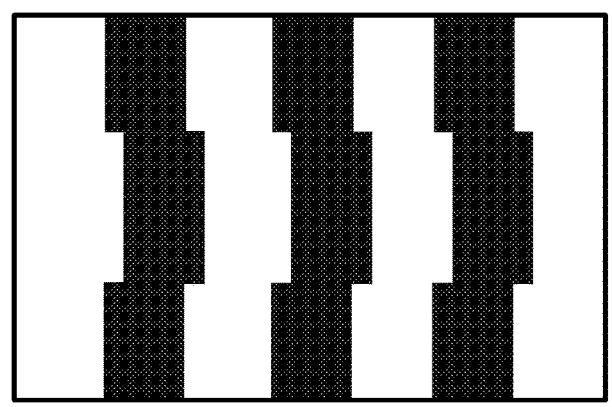

FIGS. 1A to 1C illustrate an outline of a 3D geometry measurement apparatus 100 according to the embodiment FIG. 1A shows a configuration of the 3D geometry measurement apparatus 100. The 3D geometry measurement apparatus 100 measures the 3D geometry of an object to be measured on the basis of a measurement-target captured image (measurement captured image) in which the object to be measured is captured by one or more capturing devices. The 3D geometry measurement apparatus 100 includes, as optical devices, a first capturing device 1, a second capturing device 2, and a projection device 3. The 3D geometry measurement apparatus 100 includes a control part 4 that controls various operations of the optical devices.

The projection device 3 is a projection device having alight source such as a light emitting diode, a laser, or the like. The projection device 3 projects a projection image, including patterns or the like for identifying projection coordinates, onto a measurement surface of the object to be measured. The projection coordinates indicate positions of projection pixels composing a projection image which the projection device 3 projects. The projection coordinates may be one-dimensional coordinates indicating either a vertical or horizontal position of the projection image, or two-dimensional coordinates indicating both the vertical and horizontal positions of the projection image. The patterns are, for example, stripe patterns. Further, the number of projection devices 3 is not limited to one, and the 3D geometry measurement apparatus 100 may include any number of projection devices.

The first capturing device 1 includes an optical element 11 and an imaging element 12. The optical element 11 is, for example, a lens. The optical element 11 may include a plurality of lenses or mirrors. The first capturing device 1 generates a first captured image by capturing the projection image projected on the object to be measured in response to the projection device 3 projecting the projection image onto the object to be measured. The first capturing device 1 is placed in such a manner that the optical axis of the first capturing device 1 forms a predetermined angle with the optical axis of the projection device 3.

The second capturing device 2 has an optical element 21 and an imaging element 22. The optical element 21 is, for example, a lens. The optical element 21 may include a plurality of lenses or mirrors. The second capturing device 2 generates a second captured image by capturing the projection image projected on the object to be measured in response to the projection device 3 projecting the projection image onto the object to be measured. The second capturing device 2 is placed in such a manner that the optical axis of the second capturing device 2 forms a predetermined angle with the optical axis of the projection device 3. The optical axis of the second capturing device 2 may be in the same plane as the optical axis of the first capturing device 1 and the optical axis of the projection device 3, but is not limited to this. The control part 4 is implemented by a computer, for example. The control part 4 measures a 3D geometry of the object to be measured on the basis of a plurality of captured images captured by the first capturing device 1 and the second capturing device 2. Further, the number of capturing devices is not limited to two, and the 3D geometry measurement apparatus 100 may include any number of capturing devices.

FIGS. 1B and 1C each show an example of a measurement-target captured image generated by the first capturing device 1 while the projection device 3 projects the projection image onto the object to be measured. As shown in FIGS. 1B and 1C, the projection device 3 projects a projection image including binary stripe patterns onto the object to be measured. The binary stripe patterns are composed of light-projection regions where light is projected and no-projection regions where light is not projected. FIG. 1B shows a measurement-target captured image generated with the first capturing device 1 and the second capturing device 2 when the projection device 3 projects the projection image including the binary stripe patterns onto an even measurement surface. The white regions represent the light-projection regions, and the black regions represent the no-projection regions. When the measurement surface has no irregularities, the binary stripe patterns of the measurement-target captured image generated with the first capturing device 1 and the second capturing device 2 approximately match the binary stripe patterns of the projection image in shape.

FIG. 1C is a measurement-target captured image generated with the first capturing device 1 or the second capturing device 2 when the binary stripe patterns are projected on a measurement surface having convex portions. In the measurement-target captured image of FIG. 1C, the image of a part of the binary stripe patterns is deformed. In the measurement-target captured image, the image of the binary stripe patterns is deformed by an amount according to the height of the convex portions. Therefore, the 3D geometry measurement apparatus 100 can measure the geometry of the object to be measured by identifying the height of each location of the convex portion on the basis of the amount of deformation in the image of the binary stripe patterns in the measurement-target captured image.

The 3D geometry measurement apparatus 100 stores, in a storage part, (i) geometric property information indicating parameters such as a focal length and an image center representing geometric characteristics of the first capturing device 1 and the second capturing device 2 and a function of lens distortion, etc., and (ii) information on relative positions and posture between the individual capturing device and the reference instrument. By referencing this information, the geometry of object to be measured is identified while correcting the distortion of the captured image. By capturing a feature point of the reference instrument whose two-dimensional coordinates or 3D coordinates are known in advance, the 3D geometry measurement apparatus 100 deals with an error in the measurement of 3D coordinates, which is difficult to deal with using solely geometric property information indicating geometric characteristics. Since the 3D geometry measurement apparatus 100 measures 3D coordinates of a measurement point of the object to be measured by referencing the identified error, the 3D geometry measurement apparatus 100 can correct the influence of distortion of an image more accurately.

[Configuration of the 3D Geometry Measurement Apparatus]

Figure 2:
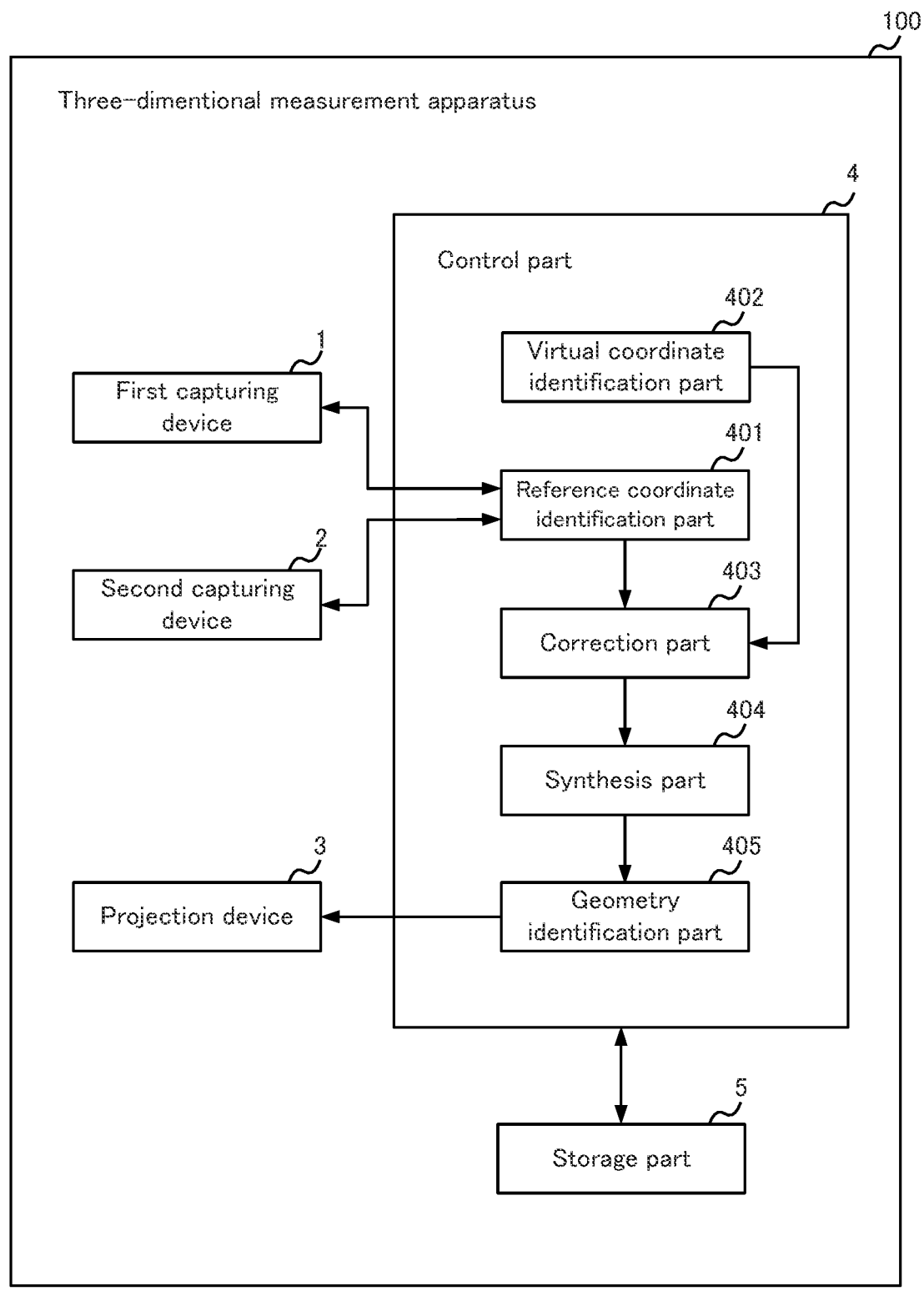

FIG. 2 shows a configuration of the 3D geometry measurement apparatus 100. The 3D geometry measurement apparatus 100 includes a storage part 5 in addition to the first capturing device 1, the second capturing device 2, the projection device 3, and the control part 4 shown in FIG. 1.

The storage part 5 includes a storage medium including a read only memory (ROM), a random access memory (RAM), a hard disk, and the like. The storage part 5 stores programs to be executed by the control part 4. The control part 4 is, for example, a central processing unit (CPU). By executing the programs stored in the storage part 5, the control part 4 functions as a reference coordinate identification part 401 (actual-measurement coordinate identification part 401), a virtual coordinate identification part 402, a correction part 403, a synthesis part 404, and a geometry identification part 405.

[Measurement of the Reference Instrument]

The reference coordinate identification part 401 generates a reference captured image (actual-measurement captured image) by having the first capturing device 1 or the second capturing device 2 capture a reference instrument having a plurality of feature points. The reference coordinate identification part 401 identifies coordinates of a pixel (hereinafter referred to as a reference captured pixel (actual-measurement captured pixel)) corresponding to the feature point of the reference instrument in the generated reference captured image.

Figure 3A:
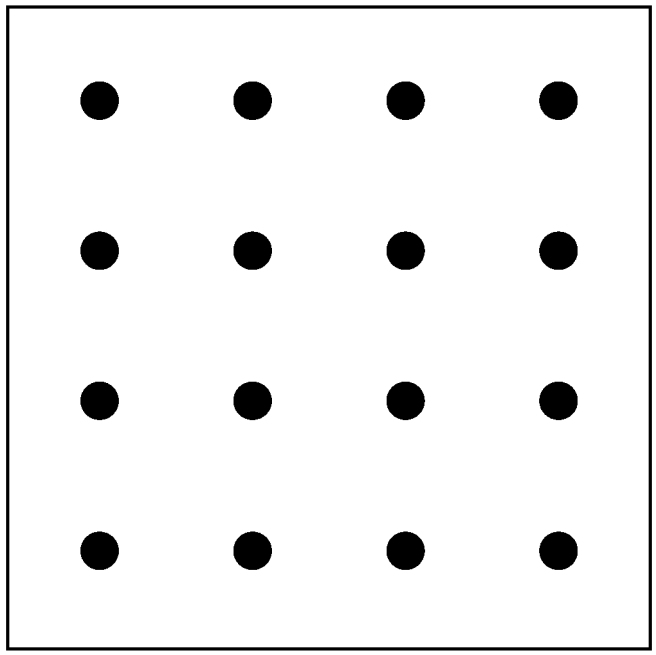
FIGS. 3A and 3B each show an example of a feature point of a reference instrument
Figure 3B:
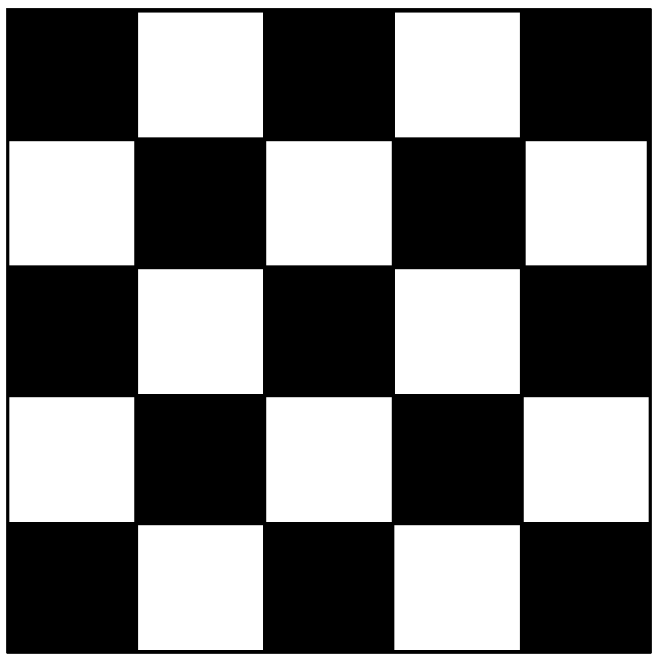

FIGS. 3A and 3B each show an example of the reference point of the reference instrument FIGS. 3A and 3B each show the reference instrument viewed from above. FIG. 3A shows a reference instrument in which a plurality of black circles are arranged in longitudinal and lateral directions. FIG. 3B shows a checkered reference instrument. When the reference instrument shown in FIG. 3A is used, the reference coordinate identification part 401 determines the center of the black circle as the feature point, and identifies coordinates of the reference captured pixel corresponding to this feature point. When the reference instrument shown in FIG. 3B is used, the reference coordinate identification part 401 determines each vertex of the white squares and the black squares that compose the checkerboard pattern as a feature point, and identifies the coordinates of the reference captured pixel corresponding to the determined feature point.

It is assumed that positions of the feature points of the reference instrument are measured in advance with another measuring instrument (not shown). For example, when any one of a plurality of feature points included in the reference instrument is the origin, relative coordinate information indicating relative coordinates of feature points other than the origin is stored in the storage part 5. Information indicating the coordinates of the plurality of feature points included in the reference instrument may be stored in the storage part 5.

Figure 4:
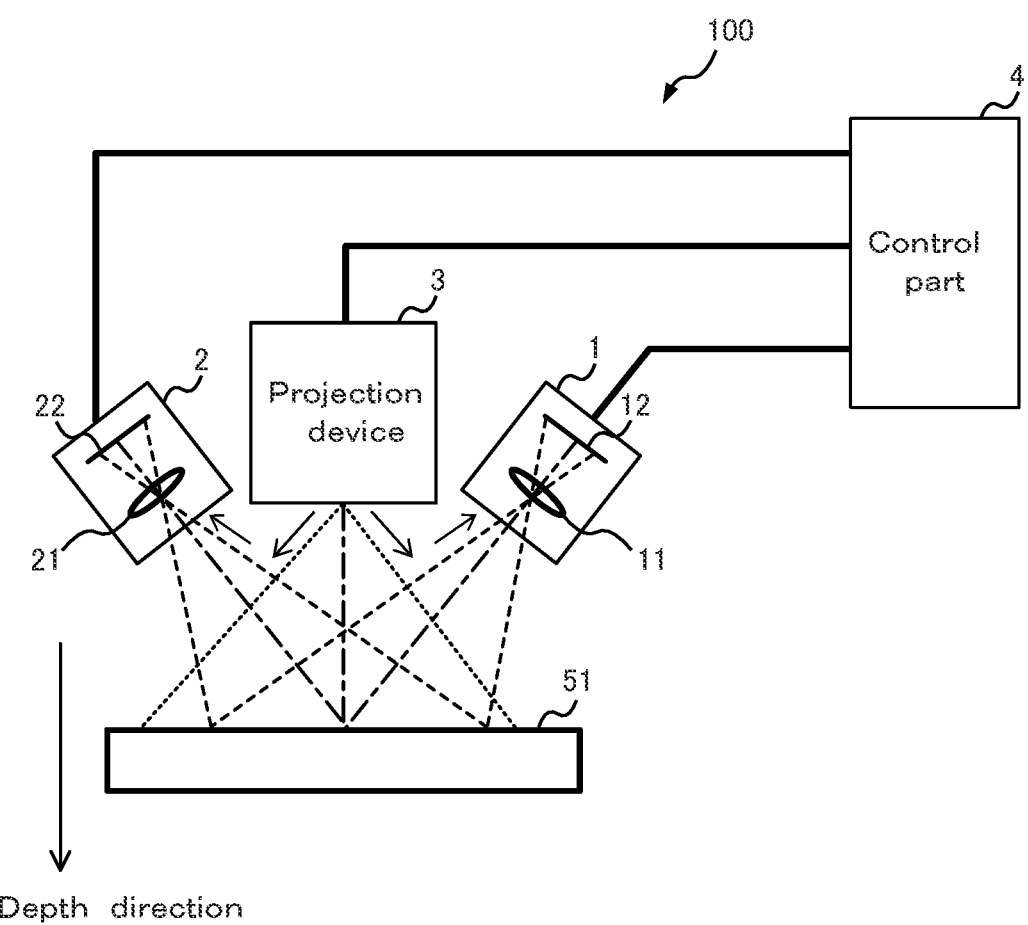

FIG. 4 shows how a reference instrument 51 is measured. In an example of FIG. 4, the reference instrument 51 is a flat plate-shaped member, but is not limited to this, and any shape may be used as the reference instrument. The reference coordinate identification part 401 captures the reference instrument 51 more than once. In the measurement, the reference instrument 51 is installed in order at a plurality of positions whose coordinates in a depth direction, shown by an arrow in FIG. 4, differ. Further, the reference instrument 51 may be installed in a plurality of different postures.

Furthermore, the plurality of positions at which the reference instrument 51 is installed, or the postures of the reference instrument 51 when the reference instrument 51 is installed at the respective positions, may be determined in advance. In such cases, such positions and postures may be schematic. The reference coordinate identification part 401 also acquires position and posture information indicating a relative position and posture between the capturing device and the reference instrument 51 when capturing the reference instrument 51 to acquire the geometric property information indicating the geometric characteristics of the capturing device. Further, the reference coordinate identification part 401 can acquire position and posture information indicating a position and posture of the reference instrument 51 by measuring 3D coordinates of individual feature points on the reference instrument 51 by triangulation, such as by combining the capturing devices with each other or by combining the capturing device with the projection device.

The reference coordinate identification part 401 generates a plurality of the reference captured images by capturing the reference instrument 51 in a state in which the reference instrument 51 is installed at the respective positions and postures. The reference coordinate identification part 401 identifies the coordinates of the reference captured pixel of the feature point of the reference instrument 51 at the plurality of positions and the like on the basis of the plurality of reference captured images.

Suppose that the position and posture information corresponding to the position and posture of the reference instrument 51 is g (=1, ... , G). Suppose that the feature point information corresponding to the feature point of the reference instrument 51 is h (=1, ... , H). Assuming that the position of the reference captured pixel on the captured image is expressed in homogeneous coordinates, the reference coordinate identification part 401 identifies coordinates $\tilde{n}_{g,h}$ of the reference captured pixel corresponding to a feature point h of the reference instrument 51, using the following Equation 1:

$$\tilde{n}_{g,h}=[u_{g,h} v_{g,h} 1]^T \quad (1)$$

In Equation 1, $u_{g,h}$ indicates the lateral component of the homogeneous coordinates in an image plane of the captured image, $v_{g,h}$ indicates the longitudinal component of the homogeneous coordinates in the image plane, and "T" indicates a transpose of a matrix.

[Identify Coordinates of a Virtual Captured Image]

A virtual coordinate identification part 402 reads, from the storage part 5, (i) geometric property information indicating the geometric characteristics of the first capturing device 1 or the second capturing device 2, and (ii) position and posture information indicating the relative position and posture of the reference instrument 51 viewed from the first capturing device 1 or the second capturing device 2. The virtual coordinate identification part 402 identifies coordinates of the captured pixel (hereinafter, also referred to as a virtual captured pixel) corresponding to the feature point in this image plane when it is assumed that the feature point on the reference instrument 51 is virtually projected on an image plane of the first capturing device 1 or the second capturing device 2 using parameters and functions included in the read geometric property information and the position and posture of the reference instrument 51 included in the position and posture information.

Figure 5:
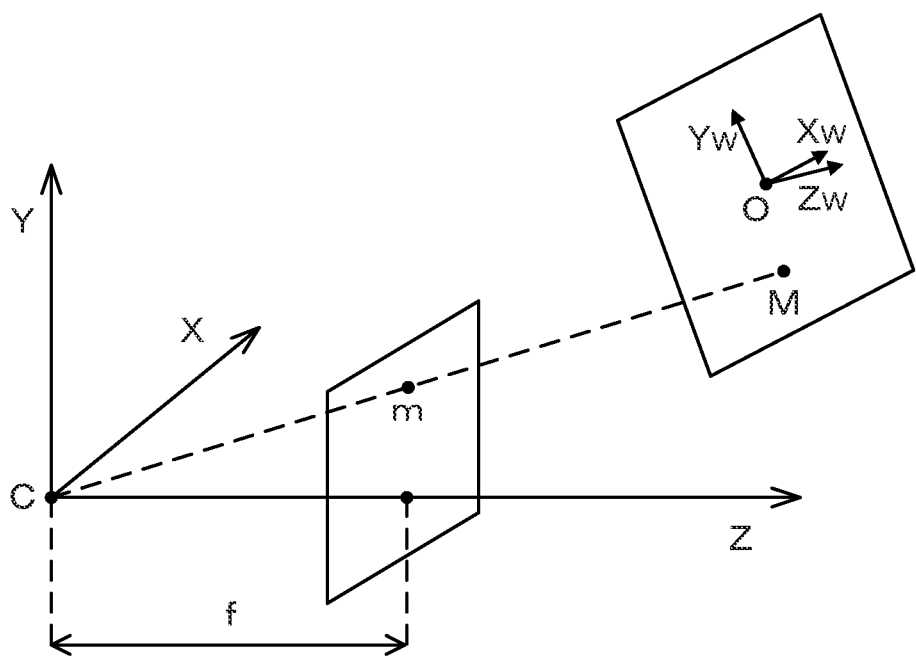

FIG. 5 illustrates a method of identifying the coordinates of the virtual captured pixel. FIG. 5 shows a camera coordinate system having an optical center C of the first capturing device 1 as the origin and a world coordinate system having a feature point O on the reference instrument 51 as the origin. An X-axis, a Y-axis and a Z-axis of the camera coordinate system, as well as an Xw-axis, a Yw-axis and a Zw-axis of the world coordinate system, are shown. The Xw-axis and the Yw-axis are coordinate axes showing a plane in which a plurality of feature points are arranged on the reference instrument 51. The Zw-axis is a coordinate axis orthogonal to the plane in which the plurality of feature points are arranged, and corresponds to the depth direction shown in FIG. 4 in the example of the embodiment. "f" in FIG. 5 indicates the focal length of the optical element 11. It should be noted that, according to custom, the image plane is shown such that it is arranged on the side where an object to be captured is present.

Using the world coordinate system, a feature point M of the reference instrument 51 is expressed as:

$$M = [X_w Y_w Z_w]^T \quad (2)$$

A virtual captured pixel m, which is the feature point M projected on the image plane of the first capturing device 1, is expressed as:

$$m = [uv]^T \quad (3)$$

The virtual captured pixel m includes a lateral component u and a longitudinal component v of the image plane.

When the feature point M and the virtual captured pixel m are represented by homogeneous coordinates, they are expressed as the following Equations 4 and 5, respectively:

$$\tilde{M} = [X_w Y_w Z_w 1]^T \quad (4)$$

$$\tilde{m} = [uv1]^T \quad (5)$$

Suppose that coordinates of the feature point M in the camera coordinate system, which is three-dimensional, are denoted by x. x can be expressed as follows:

$$x = [RT]\tilde{M} \quad (6)$$

In Equation 6, R is a rotation matrix. T is a translational vector. The rotation matrix R and the translational vector T can be used as the relative position and posture information between the capturing device and the reference instrument. If A is a matrix including information such as the focal distance of the first capturing device 1, x can be expressed as follows, using a scale factor s, which indicates magnitude $$s\tilde{m} = Ax \quad (7)$$

In Equation 7, the components of the matrix A are:

$$A = \begin{bmatrix} \alpha & 0 & u_0 \\ 0 & \beta & v_0 \\ 0 & 0 & 1 \end{bmatrix} \quad (8)$$

Among the components of the matrix A shown in Equation 8, $u_0$ indicates the lateral component of the center of the captured image. $v_0$ indicates the longitudinal component of the center of the captured image. Using the focal length f and the number of pixels $k_u$ per lateral unit length, $\alpha$ can be expressed as:

$$\alpha = fk_u \quad (9)$$

Using the focal length f and the number of pixels $k_v$ per longitudinal unit length, $\beta$ can be expressed as:

$$\beta = fk_v \quad (10)$$

In addition, a shear coefficient, which is omitted in Equation 8, may be included.

When both sides of Equation 7 are normalized, it will be expressed as Equation 11 shown below.

$$\tilde{m} = A\tilde{x} \quad (11)$$

Each component of "x-tilde" in Equation 11 is expressed as Equation 12 shown below.

$$\tilde{x} = [x_n y_n 1]^T \quad (12)$$

When Equations 5, 11, and 12 are rewritten in consideration of a distortion of an image in the first capturing device 1, the following Equations 13 to 15 are obtained.

$$\widetilde{m_d} = [u_d v_d 1]^T \quad (13)$$

$$\widetilde{m_d} = A\widetilde{x_d} \quad (14)$$

$$\widetilde{x_d} = [x_d y_d 1]^T \quad (15)$$

The subscript d of each variable in the equations indicates that the image distortion is taken into account. The image distortion can be expressed as shown in the following Equation 16, using a function included in the geometric property information of the first capturing device 1 or the second capturing device 2 in the normalized camera coordinate system. Contents of the geometric property information are parameters such as a focal length and an image center representing the geometric characteristics of the first capturing device 1 or the second capturing device 2 and a function of lens distortion.

$$\begin{bmatrix} x_d \\ y_d \end{bmatrix} = \begin{bmatrix} x_n \\ y_n \end{bmatrix} + (k_1 r_n^2 + k_2 r_n^4)\begin{bmatrix} x_n \\ y_n \end{bmatrix} + \begin{bmatrix} 2p_1 x_n y_n + p_2(r_n^2 + 2x_n^2) \\ p_1(r_n^2 + 2y_n^2) + 2p_2 x_n y_n \end{bmatrix} \quad (16)$$

In Equation 16, $r_n$ is expressed as:

$$r_n^2 = x_n^2 + y_n^2 \quad (17)$$

Also, $k_i$ (i=1, 2) is a coefficient for a distortion in a radial direction of the optical element. $p_i$ (i=1, 2) is a coefficient for a distortion in a circumferential direction. The homogeneous coordinates of $x_d$ are expressed by the following Equation 18, using a predetermined function $f_a$.

$$\tilde{x}_d = f(k, p, \tilde{x}) = f_a(k, p, R, T, \tilde{M}) \quad (18)$$

Similarly, using a predetermined function $f_b$. Equation 12 is modified to be Equation 19 shown below:

$$\tilde{m}_d = A\tilde{x}_d = f_b(A, k, p, R, T, \tilde{M}) \quad (19)$$

Further, the geometric property information indicating the geometric characteristics such as the first capturing device 1 is not limited to the example including the function using both the coefficient for the distortion in the radial direction of the optical element and the coefficient for the distortion in the circumferential direction of the optical element. For example, the geometric property information indicating the geometric characteristics such as the first capturing device 1 may include at least one of a function using the coefficient for the distortion in the radial direction of the optical element, or a function using the coefficient for the distortion in the circumferential direction of the optical element. It should be noted that the functions of the lens distortion shown here are examples, and any form thereof can be handled. Further, depending on the degree of lens distortion, it is not necessary to use the function of lens distortion itself.

The virtual coordinate identification part 402 uses a rotation matrix $R_g$ and a translational vector $T_g$ to identify the homogeneous coordinates of the virtual captured pixel m corresponding to the feature point M having the position and posture information g, using the following Equation 20:

$$\tilde{m}_{d,g,h} = f_b(A,k,p,R_g,T_g,\tilde{M}_h) \tag{20}$$

The virtual coordinate identification part 402 obtains the variables A, k, p, $R_g$, $T_g$ of Equation 20 such that the error between the homogeneous coordinates $\tilde{n}_{g,h}$ of the reference captured pixel and the coordinates of the virtual captured pixel m is minimized, and stores each obtained variable in the storage part 5.

[Identification of the Error]

The correction part 403 compares the coordinates of the reference captured pixel identified by the reference coordinate identification part 401 with the coordinates of the virtual captured pixel obtained with Equation 20. The correction part 403 generates correction information for correcting the coordinates of the captured pixel on the basis of a comparison result.

Figure 6:
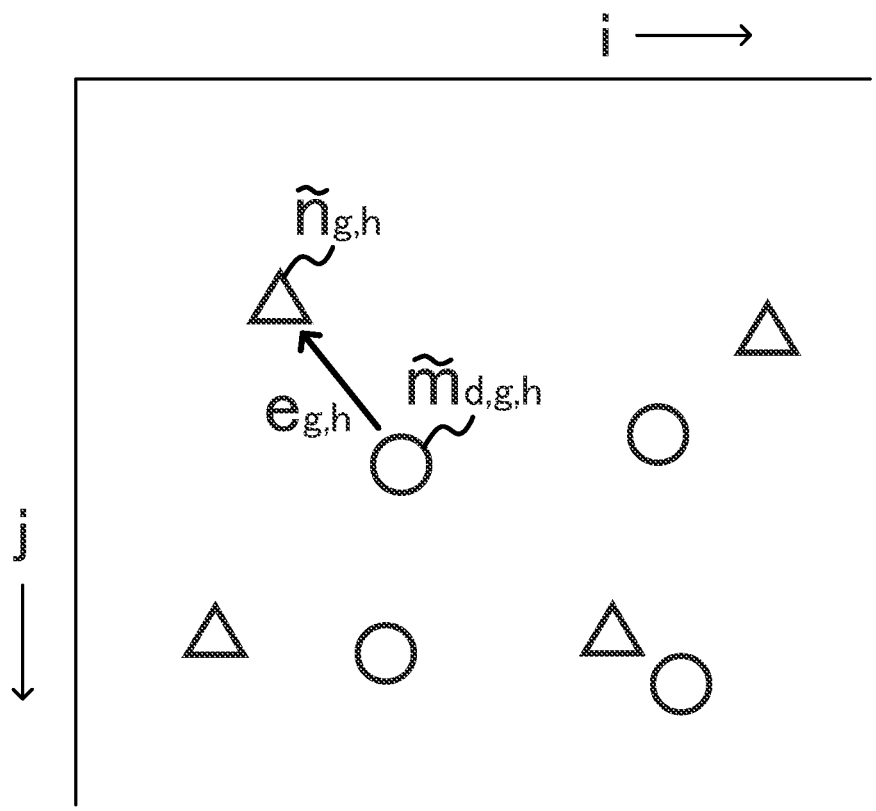

FIG. 6 shows an example of an error between the reference captured pixel and the virtual captured pixel. In FIG. 6, "i" indicates the horizontal coordinate in the reference captured image and "j" indicates the vertical coordinate in the reference captured image. The reference captured pixels are indicated by circles, and the virtual captured pixels are indicated by triangles. The correction part 403 determines the respective variables of Equation 20, and then identifies an error between the coordinates of the virtual captured pixel and the coordinates of the reference captured pixel. An error $e_{g,h}$ between the reference captured pixel and the virtual captured pixel is shown by an arrow in FIG. 6. The error $e_{g,h}$ between the coordinates $\tilde{n}_{g,h}$ of the reference captured pixel shown in Equation 1 and the coordinates $\tilde{m}_{d,g,h}$ of the virtual captured pixel shown in Equation 20 is expressed by the following Equation 21.

$$e_{g,h} = \tilde{n}_{g,h} - \tilde{m}_{d,g,h} = (e_{1,g,h}, e_{2,g,h}) \tag{21}$$

The error $e_{g,h}$ includes a component $e_{1,g,h}$ along the i-direction of the captured image and a component $e_{2,g,h}$ along the j-direction of the captured image. The correction part 403 associates the error $e_{g,h}$ and the coordinates of the reference captured pixel corresponding to the error $e_{g,h}$ with each other and stores them in the storage part 5.

[Generating an Error Image]

The correction part 403 estimates an error, by an interpolation process, also for a captured pixel not associated with an error in the storage part 5. First, the correction part 403 acquires, from the storage part 5, a plurality of errors of a plurality of the reference captured pixels associated with coordinates which are different from the coordinates of the captured pixel with which an error is not associated. For example, the correction part 403 acquires a plurality of errors associated in the storage part 5 with coordinates within a predetermined distance from the captured pixel with which the error is not associated.

The correction part 403 estimates an error of the coordinates of the captured pixel with which the error is not associated, using the interpolation process such as a linear interpolation process based on the acquired plurality of errors. The correction part 403 generates an error image in which the estimated error and coordinates of the captured pixel corresponding to this error are associated. The correction part 403 incorporates, in the error image, a combination in which the coordinates of the reference captured pixel and the error corresponding to the coordinates of the reference captured pixel are associated with each other.

The error image can be expressed as:

$$E_g = (E_{1,g}, E_{2,g}) \tag{22}$$

In Equation 22, $E_{1,g}$ indicates an error component along the horizontal direction of the coordinates of the reference captured pixel, and $E_{2,g}$ indicates an error component along the vertical direction of the coordinates of the reference captured pixel. The correction part 403 generates a plurality of error images corresponding to the plurality of reference captured images when the plurality of reference captured images are generated by the reference coordinate identification part 401. The correction part 403 stores, in the storage part 5, the generated error image as the correction information for correcting the coordinates of the captured pixel. The error image can include an error that might be difficult to express with the function of Equation 16. Therefore, the correction part 403 can improve accuracy of a correction of the image distortion by correcting a measurement result of the object to be measured by referencing the function of Equation 16 and the error image.

[Generating a Single Error Image]

The synthesis part 404 acquires, from the storage part 5, an error associated with the captured pixel in one error image and an error associated with the same captured pixel in another error image. The synthesis part 404 calculates a new error associated with the captured pixel by averaging the plurality of acquired errors. The synthesis part 404 generates a single error image by repeating the same processing for the other captured pixels. For example, the synthesis part 404 generates a single error image by averaging error components corresponding to a plurality of error images as shown in the following Equation 23.

$$E = \frac{1}{G_x} \sum_g E_g = \frac{1}{G_x} \left( \sum_g E_{1,g}, \sum_g E_{2,g} \right) \tag{23}$$

In Equation 23, $G_x$ indicates the number of error images.

The synthesis part 404 is not limited to the example in which the plurality of error images are averaged to generate a single error image. For example, the synthesis part 404 may generate a plurality of error images by averaging the error images whose coordinates in the depth direction are relatively close to each other. For example, the synthesis part 404 may generate a plurality of averaged error images by averaging the error images of No. 1 to No. 3 among the plurality of error images of No. 1 to No. 8 to generate an error image, and averaging the error images of No. 2 to No. 4 to generate another error image. By doing this, the number of error images stored in the storage part 5 may be reduced to reduce the processing load or required memory capacity, and conversely, the number of error images may be increased to improve correction accuracy. It should be noted that the acquired relative position and posture information of the capturing device and the reference instrument may be used as the coordinates in the depth direction of the reference instrument. It is also possible to use information about installation positions of the reference instrument designated in advance, measurement results of 3D coordinates of the feature points of the reference instrument obtained by a plurality of capturing devices or a combination of a capturing device and a projection device, or the like.

[Correction Using the Geometric Property Information]

The geometry identification part 405 projects a projection image onto the measurement surface of the object to be measured with the projection device 3. The geometry identification part 405 controls the first capturing device 1 and the second capturing device 2 to generate a measurement-target captured image by capturing the object to be measured while the projection image is projected. Hereinafter, a measurement-target captured image generated by the first capturing device 1 may be referred to as a first measurement-target captured image, and a measurement-target captured image generated by the second capturing device 2 may be referred to as a second measurement-target captured image.

The geometry identification part 405 corrects coordinates of a plurality of measurement-target captured pixels (measurement captured pixels) included in the measurement-target captured image on the basis of (i) a function included in the geometric property information, which is stored in the storage part 5 and indicates the geometric characteristics of the first capturing device 1 or the second capturing device 2, shown in Equation 16, and (ii) the error image which the correction part 403 generated as the correction information. The geometry identification part 405 corrects, for the coordinates of the respective measurement-target captured pixels included in the measurement-target captured image, an overall distortion using the function included in the geometric property information of the first capturing device 1 or the second capturing device 2, shown in Equation 16.

[Correction Using a Single Error Image]

The geometry identification part 405 reads, from the storage part 5, a single error image which the synthesis part 404 synthesized. The geometry identification part 405 identifies coordinates of a pixel that correspond to the coordinates of the measurement-target captured pixel in the error image. For example, the geometry identification part 405 identifies coordinates of the pixel closest to the coordinates of the measurement-target captured pixel in the error image. The geometry identification part 405 identifies the error associated with the coordinates of the pixel identified in the error image.

The geometry identification part 405 corrects the coordinates of the measurement-target captured pixel on the basis of the identified error. For example, the geometry identification part 405 corrects a local distortion for the coordinates (i, j) of the measurement-target captured pixel included in the measurement-target captured image, by changing the coordinate in the horizontal direction by an error component $E_{1,g}(i, j)$ and changing the coordinate in the vertical direction by an error component $E_{2,g}(i, j)$. The error components $E_{1,g}(i, j)$ and $E_{2,g}(i, j)$ are indicated by the error image.

[Identification of Projection Coordinates]

The geometry identification part 405 calculates the measurement 3D coordinates of the measurement point of the object to be measured on the basis of the corrected coordinates of the measurement-target captured pixel. In the embodiment, an example in which the geometry identification part 405 calculates measurement 3D coordinates of a measurement point by identifying correspondence between a first measurement-target captured pixel of the first measurement-target captured image and a second measurement-target captured pixel of the second measurement-target captured image will be described.

FIGS. 7A to 7F respectively show examples of types of projection images which the geometry identification part 405 projects. The black regions in FIGS. 7A to 7F represent no-projection regions where the geometry identification part 405 does not project light, and the white regions represent light-projection regions where the geometry identification part 405 projects light.

Figure 7A:
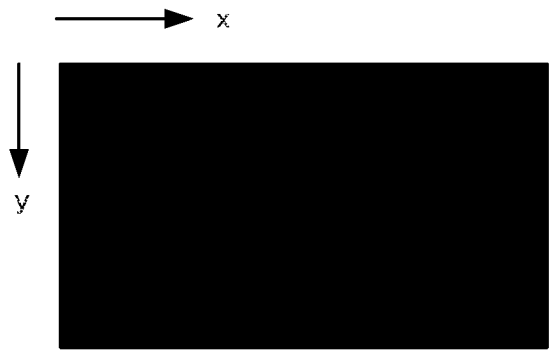
FIGS. 7A to 7F respectively show examples of types of projection images which a geometry identification part projects.
Figure 7B:
Figure 7C:
Figure 7D:
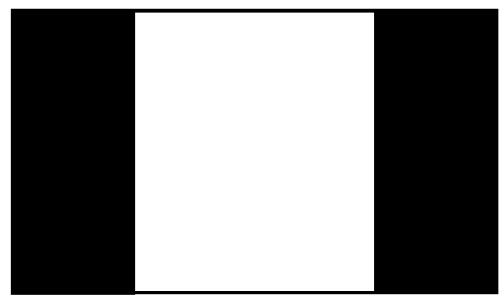
Figure 7E:
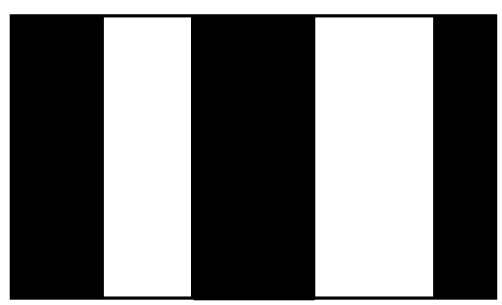

FIG. 7A shows a standard pattern by which light is not projected onto any part of the object to be measured (i.e., an all-black pattern). FIG. 7B shows a standard pattern by which light is projected onto the entire object to be measured (i.e., an all-white pattern). FIGS. 7C to 7 F show binary stripe patterns, which are composed of light-projection regions and no-projection regions and in which the stripes that have a different width for ach projection image are arranged in the same direction. The stripe patterns shown in FIGS. 7C to 7F correspond to Gray codes and are used for identifying projection coordinates indicating positions of projection pixels of the projection image corresponding to the measurement-target captured pixels in the measurement-target captured image. Details will be described below.

Figure 7F:
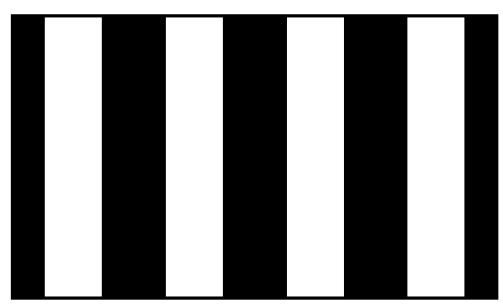
Figure 8A:
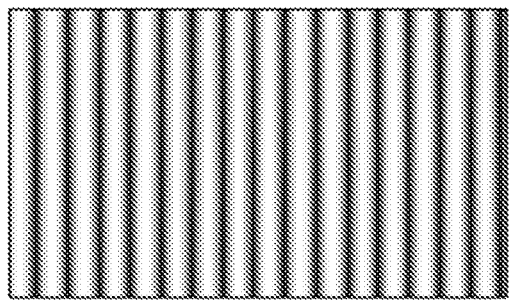
FIGS. 8A to 8D respectively show examples of gradation stripe patterns having sinusoidal luminance distributions.
Figure 8B:
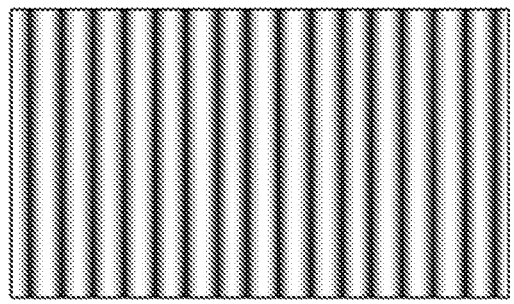
Figure 8C:
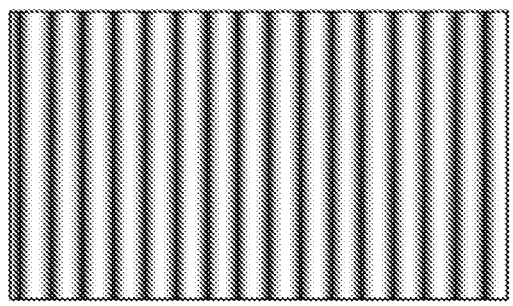
Figure 8D:
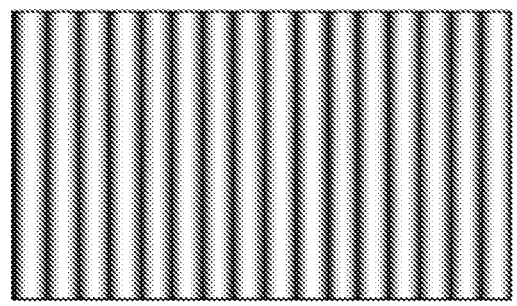

The geometry identification part 405 projects projection images including gradation stripe patterns having sinusoidal luminance distributions onto the object to be measured. FIGS. 8A to 8D respectively show examples of gradation stripe patterns having sinusoidal luminance distributions. While the binary stripe patterns shown in FIGS. 70 to 7F are binary images composed of the black regions and the white regions, in the gradation stripe patterns shown in FIGS. 8A to 8D, shading changes in a sinusoidal manner from the white region to the black region along the width direction of the stripes. Intervals between the stripes in the gradation stripe patterns of FIGS. 8A to 8D are constant, and the spatial frequency of the stripes in the gradation stripe patterns is, for example, four times the spatial frequency of the binary stripe patterns of FIG. 7F.

The gradation stripe patterns of FIGS. 8A to 8D are different from each other in the point that the phases of the sine waves indicating the luminance distribution differ by 90 degrees from each other, and their luminance distributions are otherwise the same. In this embodiment, the geometry identification part 405 projects a total of ten projection images: two standard patterns shown in FIGS. 7A and 7B, four binary stripe patterns shown in FIGS. 70 to 7F, and four gradation stripe patterns shown in FIGS. 8A to 8D. The gradation stripe patterns shown in FIGS. 8A to 8D, together with the stripe patterns shown in FIGS. 7A to 7F, are used for identifying the projection coordinates. The geometry identification part 405 may also project, onto the object to be measured, a plurality of projection images including patterns in which the widths of the stripes differ depending on a direction in which the stripes extend.

Figure 9:
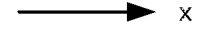

As noted above, the binary stripe patterns shown in FIGS. 70 to 7F correspond to Gray codes. FIG. 9 shows examples of Gray codes corresponding to the binary stripe patterns shown in FIGS. 7C to 7F. By associating 0s in the Gray codes with the no-projection regions and 1s with the light-projection regions, the binary stripe patterns shown in FIGS. 7C to 7F are generated.

Each position in the x-direction in FIGS. 7A to 7F and FIG. 9 is represented by a code value, which is the combination of the numbers 0 and 1 at the respective positions in the Gray codes. Position 0 in FIG. 9 corresponds to the code value of "0000," Position 1 corresponds to the code value of "0001," and Position 15 corresponds to the code value of "1000."

The geometry identification part 405 generates a measurement-target captured image in which the projection image projected onto the object to be measured is captured by the first capturing device 1 and a measurement-target captured image in which the projection image projected onto the object to be measured is captured by the second capturing device 2. The geometry identification part 405 identifies the projection coordinates indicating the positions of the projection pixels corresponding to the measurement-target captured pixels included in the measurement-target captured image, on the basis of the patterns included in the measurement-target captured image. The geometry identification part 405 identifies the projection coordinates corresponding to the measurement-target captured pixels included in the measurement-target captured image by analyzing a change in shading in the patterns included in the measurement-target captured image.

The geometry identification part 405 calculates, for each pixel, an average of a luminance value when the all-black pattern shown in FIG. 7A is projected and a luminance value when the all-white pattern shown in FIG. 7B is projected, as a median. Similarly, regarding the measurement-target captured images while the binary stripe patterns shown in FIGS. 7C to 7F are projected onto object to be measured, the geometry identification part 405 identifies the code values of the respective measurement-target captured pixels by comparing luminance values of the respective measurement-target captured pixels in four measurement-target captured images with the corresponding median values. By identifying the code values, the geometry identification part 405 can identify which binary stripe is reflected at each pixel position of the measurement-target captured pixel within the binary stripes projected toward different positions. The geometry identification part 405 identifies the position, from Position 1 to Position 15 shown in FIG. 9, at which each captured pixel included in the measurement-target captured image is included.

Further, the geometry identification part 405 identifies, as the projection coordinates, a phase of a sine wave corresponding to the measurement-target captured pixel in the measurement-target captured image when the gradation stripe patterns having sinusoidal luminance distributions are projected onto the object to be measured. Because the gradation stripe patterns of the projection image have periodicity, a plurality of projection pixels in the projection image have the same projection coordinates. Hereinafter, the projection coordinates with periodicity in projection images are also referred to as relative projection coordinates. Furthermore, the projection coordinates uniquely determined in the projection image are also referred to as absolute projection coordinates.

Figure 10:
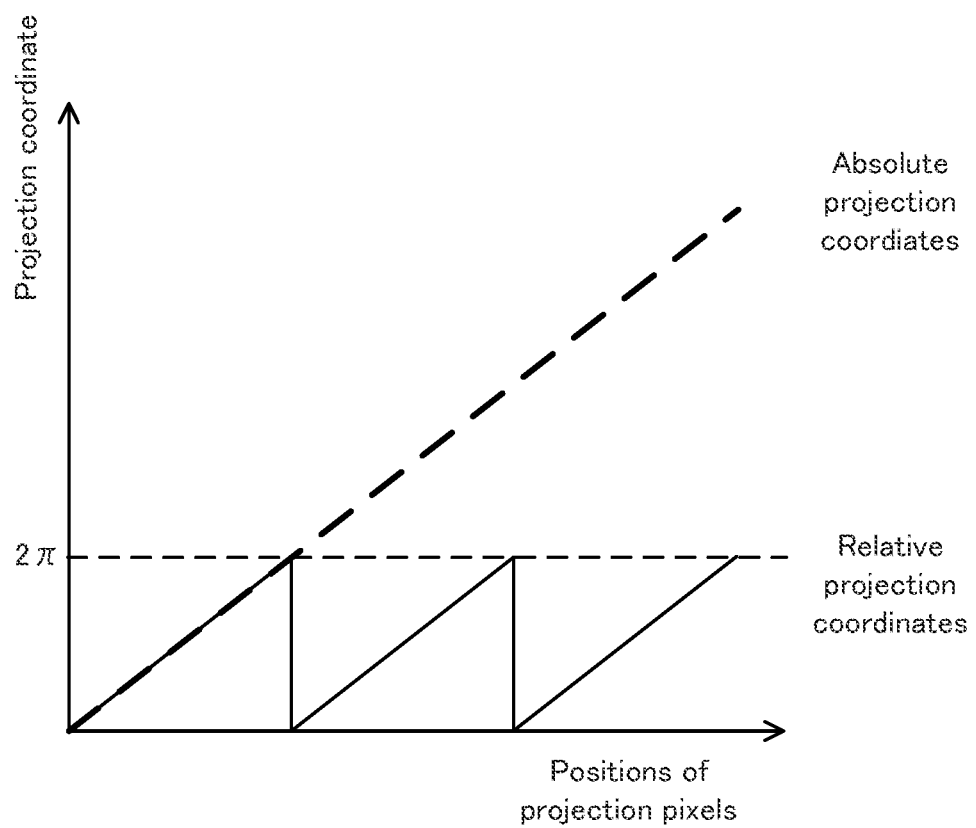

FIG. 10 shows a relationship between the absolute projection coordinates and the relative projection coordinates. The vertical axis of FIG. 10 indicates the projection coordinate. The horizontal axis of FIG. 10 indicates the positions of the projection pixels in the width direction of the stripes included in the projection image. The width direction is a direction orthogonal to a direction in which the stripes extend. As the solid line in FIG. 10 shows, the relative projection coordinates have periodicity. The relative projection coordinates show the same value for each cycle of a repetition of the gradation stripe patterns having sinusoidal luminance distributions. On the other hand, as a broken line in FIG. 10 shows, the absolute projection coordinates are uniquely determined in the projection image.

The geometry identification part 405 identifies the relative projection coordinates corresponding to the measurement-target captured pixels by analyzing the shade of the gradation stripe patterns. The geometry identification part 405 identifies the absolute projection coordinates corresponding to the measurement-target captured pixel by identifying, on the basis of Gray codes indicated by the binary stripe patterns, which position from Position 0 to Position 15 the measurement-target captured pixel corresponds to.

[Identification of Correspondence of the Measurement 3D Coordinates]

Figure 11:
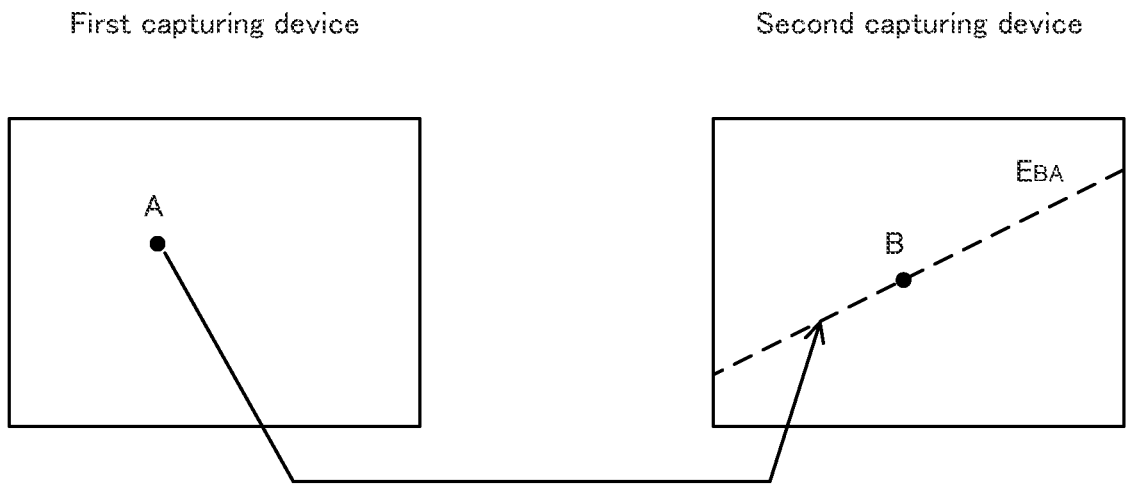
FIG. 11 shows correspondence between a first measurement-target captured pixel and a second measurement-target captured pixel.

Correspondence between the first measurement-target captured pixel included in the first measurement-target captured image generated with the first capturing device 1 and the second measurement-target captured pixel included in the second measurement-target captured image generated with the second capturing device 2 can be obtained by using an epipolar line. FIG. 11 shows correspondence between a first measurement-target captured pixel and a second measurement-target captured pixel. The left side of FIG. 11 shows an image plane of the first measurement-target captured image, and the right side of FIG. 11 shows an image plane of the second measurement-target captured image.

In the image plane of the second measurement-target captured image, an epipolar line $E_{BA}$ corresponding to the first measurement-target captured pixel A is shown. Assuming that the first measurement-target captured pixel A and the second measurement-target captured pixel B correspond to the same measurement point M of the object to be measured, the second measurement-target captured pixel B is on the epipolar line $E_{BA}$ in the image plane of the second measurement-target captured image.

The geometry identification part 405 identifies the second measurement-target captured pixel B corresponding to the same measurement point M as the first measurement-target captured pixel A on the object to be measured. Specifically, the geometry identification part 405 identifies the second measurement-target captured pixel B on the epipolar line $E_{BA}$ corresponding to the first measurement-target captured pixel A and having the same absolute projection coordinates as the first measurement-target captured pixel A. When the subscript indicating the first capturing device 1 is α, Equation 19 can be rewritten as the following Equation 24:

$$\tilde{m}_{\alpha,d,1} = f_b(A_\alpha, k_\alpha, p_\alpha, R_{\alpha,1}, T_{\alpha,1}, \tilde{M}) \quad (24)$$

When the subscript indicating the second capturing device 2 is β. Equation 19 can be rewritten as the following Equation 25:

$$\tilde{m}_{\beta,d,1} = f_b(A_\beta, k_\beta, p_\beta, R_{\beta,1}, T_{\beta,1}, \tilde{M}) \quad (25)$$

The first measurement-target captured pixel A and the second measurement-target captured pixel B corresponding to the same measurement point M of the object to be measured are used for the calculation of coordinates. The geometry identification part 405 reads, from the storage part 5, the variables $A_\alpha$, $k_\alpha$, $p_\alpha$, $R_{\alpha,1}$, $T_{\alpha,1}$, $A_\beta$, $k_\beta$, $p_\beta$, $R_{\beta,1}$, and $T_{\beta,1}$ obtained by the virtual coordinate identification part 402 and the error image. Using the read $A_\alpha$, $k_\alpha$, $p_\alpha$, $R_{\alpha,1}$, $T_{\alpha,1}$, $A_\beta$, $k_\beta$, $p_\beta$, $R_{\beta,1}$, $T_{\beta,1}$, and error image, the geometry identification part 405 can calculate the measurement 3D coordinates "M-tilde" of the measurement point M and correct distortion of the captured image.

The geometry identification part 405 similarly calculates measurement 3D coordinates of the other measurement points of the object to be measured. The geometry identification part 405 identifies the geometry of the object to be measured on the basis of the 3D coordinates of the plurality of calculated measurement points. Further, the geometry identification part 405 is not limited to the example of calculating the measurement 3D coordinates of the measurement point by identifying correspondence between the first measurement-target captured pixel A and the second captured pixel B. For example, the geometry identification part 405 may calculate the measurement 3D coordinates of the measurement point by identifying a combination of the first measurement-target captured pixel A and the projection pixel included in the projection image.

[Variation Example of Selecting an Error Image to be Corrected]

In addition, the geometry identification part 405 may select an error image to be used for correction for each measurement-target captured pixel. The correction part 403 generates an error table in which coordinates in the depth direction at which the reference instrument 51 is installed are associated with the error image, and stores the error table in the storage part 5.

The geometry identification part 405 obtains an approximate value of the measurement 3D coordinates corresponding to the measurement-target captured pixel included in the measurement-target captured image. For example, the geometry identification part 405 obtains the approximate value of the measurement 3D coordinates of the measurement point of the object to be measured without using an error image. The geometry identification part 405 may obtain the approximate value of the measurement 3D coordinates by reducing the number of significant digits of data. The geometry identification part 405 acquires the error table from the storage part 5.

The geometry identification part 405 references the error table that includes a plurality of the error images and compares (i) the coordinates in the depth direction of the positions of the reference instrument corresponding to the error images and (ii) the coordinate in the depth direction of the obtained approximate value. The geometry identification part 405 selects the error image on the basis of the comparison result. For example, the geometry identification part 405 selects the error image which is associated with the coordinate in the depth direction closest to the coordinate in the depth direction of the obtained approximate value.

The geometry identification part 405 calculates the measurement 3D coordinates by referencing the selected error image. For example, the geometry identification part 405 identifies the error which is associated with the coordinates of the captured pixel closest to the approximate value of the measurement 3D coordinates. The geometry identification part 405 corrects the coordinates of the measurement-target captured pixel on the basis of the identified error. The geometry identification part 405 calculates the measurement 3D coordinates of the measurement point on the basis of the corrected coordinates of the measurement-target captured pixel.

Further, regarding the depth direction, the geometry identification part 405 may select a plurality of error images near the coordinate in the depth direction of the approximate value, and obtain a value of the error image corresponding to the coordinate in the depth direction of the approximate value by interpolation. As an example, by using the plurality of selected error images, the geometry identification part 405 may obtain the value of the error image corresponding to the coordinate in the depth direction of the approximate value by linear interpolation. This way enables correction with higher accuracy to be carried out.

The following method may be used to obtain the approximate value. For example, with the measurement system of FIG. 1, a measurement can be performed with a combination of a plurality of devices such as a calculation of 3D coordinates by combining a capturing device and a projection device, a calculation of 3D coordinates using two capturing devices and a projection device, or the like. The result of a certain measurement system among a plurality of measurement systems obtained in this manner may be used as the approximate value. For example, 3D coordinates combining a capturing device and a projection device can be used for the approximate value for the measurement using two capturing devices and a projection device. In this manner, it is possible to improve measurement efficiency.

The geometry identification part 405 is not limited to the example in which the error image is used to correct the image distortion. For example, the geometry identification part 405 may correct a distortion of an image of the projection device 3 using an error image. Since the projection device 3 is the same as the first capturing device 1 except that a traveling direction of light is reversed, the geometry identification part 405 can correct, in a similar manner as with the first capturing device 1, the image distortion of the projection device 3.

[Processing Procedure of Generating an Error Image]

Figure 12:
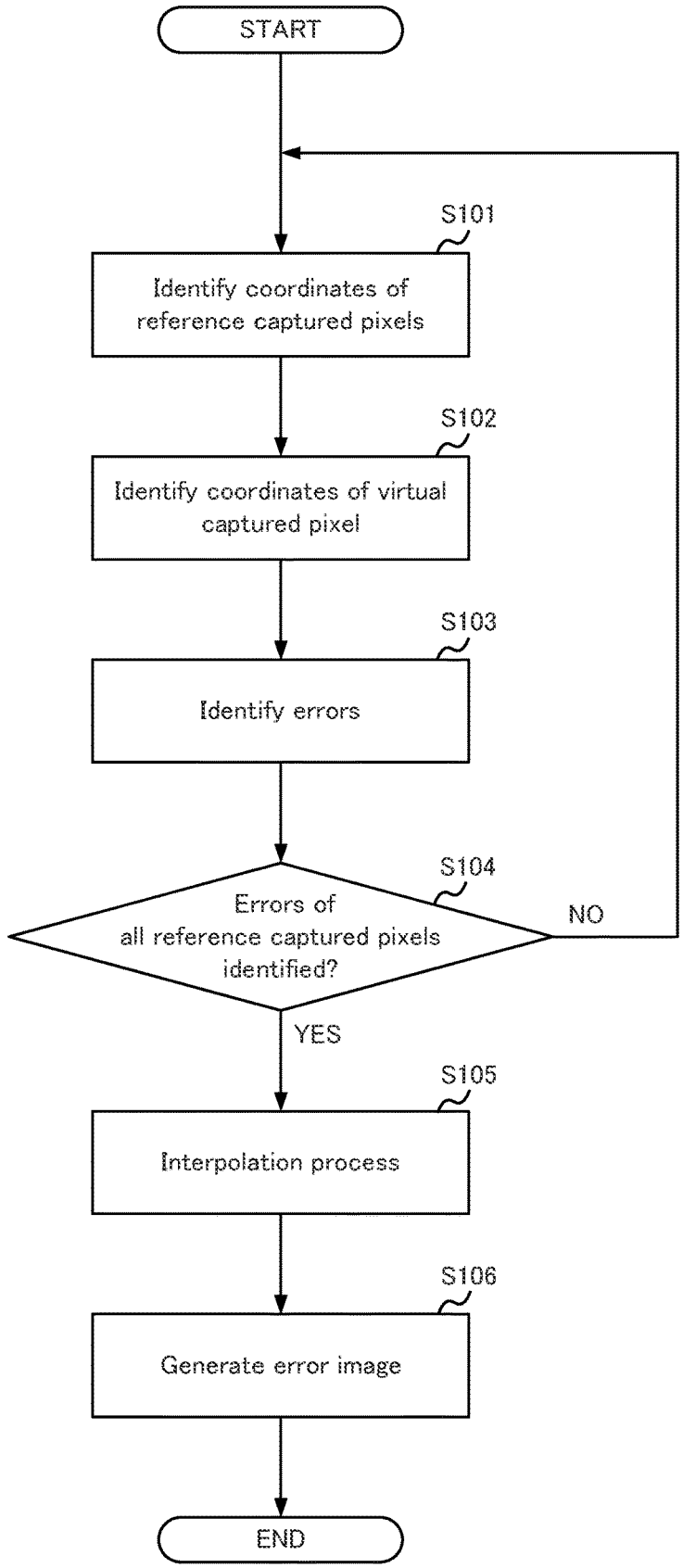
FIG. 12 is a flowchart showing a processing procedure of generating an error image performed by the 3D geometry measurement apparatus.

FIG. 12 is a flowchart showing a processing procedure of generating an error image performed by the 3D geometry measurement apparatus 100. This processing procedure starts, for example, when an operation reception part (not shown) receives, in a state where the reference instrument 51 is installed, a user's operation instructing a calibration of the function included in the geometric property information of the first capturing device 1 stored in the storage part 5.

First, the reference coordinate identification part 401 generates an reference captured image by capturing the reference instrument 51 having a plurality of feature points with the first capturing device 1. The reference coordinate identification part 401 identifies coordinates of the reference captured pixels corresponding to the feature points of the reference instrument 51 by analyzing the generated reference captured image (S101). The virtual coordinate identification part 402 reads, from the storage part 5, the geometric property information including parameters and functions representing the geometric characteristics of the first capturing device 1 and the position and posture information identifying the position and posture of the reference instrument 51. The virtual coordinate identification part 402 identifies coordinates of the virtual captured pixel using the read geometric property information and the position and posture information (S102).

The correction part 403 identifies errors between the coordinates of the virtual captured pixel and the coordinates of the reference captured pixels (S103). The reference coordinate identification part 401 determines whether or not the errors corresponding to all of the reference captured pixels have been identified (S104). When it is determined that the errors corresponding to all of the reference captured pixels have been identified in the determination of step S104 (YES in S104), the reference coordinate identification part 401 performs an interpolation process based on the acquired plurality of errors (S105), and estimates an error corresponding to the captured pixel with which the error is not associated.

The correction part 403 generates an error image by associating the estimated error with coordinates of the captured pixel corresponding to this error (S106), and finishes the processing. When it is determined that the errors corresponding to all of the reference captured pixels have not been identified in the determination of step S104 (NO in S104), the reference coordinate identification part 401 returns to the processing of step S101.

[Processing Procedure of Geometry Identification of the Object to be Measured]

Figure 13:
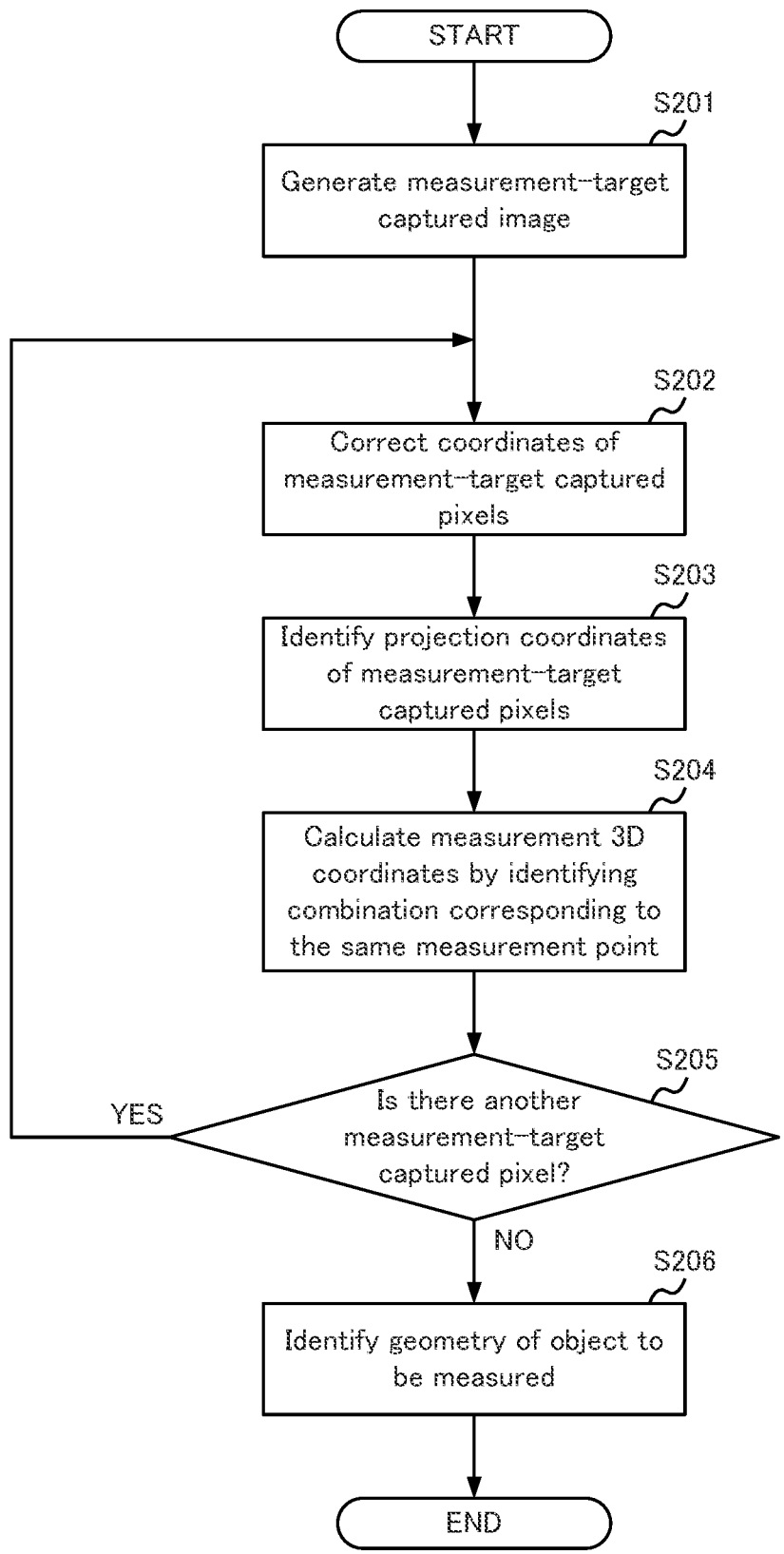
FIG. 13 is a flowchart showing a processing procedure of identifying a geometry of the object to be measured performed by the 3D geometry measurement apparatus.

FIG. 13 is a flowchart showing a processing procedure of identifying the geometry of the object to be measured performed by the 3D geometry measurement apparatus 100.

This processing procedure starts when the operation reception part receives a user's operation instructing the identification of the geometry of the object to be measured.

First, the geometry identification part 405 generates a measurement-target captured image in which the projection image projected onto the object to be measured is captured by the first capturing device 1 and a measurement-target captured image in which the projection image projected onto the object to be measured is captured by the second capturing device 2 (S201). The geometry identification part 405 corrects coordinates of the measurement-target captured pixels included in the measurement-target captured image using a function representing the geometric characteristics of the first capturing device 1, or the like. The geometry identification part 405 references a single error image, which the synthesis part 404 synthesized, and corrects the coordinates of the measurement-target captured pixels included in the measurement-target captured image (S202).

The geometry identification part 405 identifies projection coordinates that indicate positions of the projection pixels corresponding to the measurement-target captured pixels by analyzing a change in shading in the patterns included in the corrected measurement-target captured image (S203). The geometry identification part 405 calculates the measurement 3D coordinates of the measurement point of the object to be measured by identifying a combination of the first measurement-target captured pixel and the second measurement-target captured pixel that correspond to the same measurement point of the object to be measured (S204).

The geometry identification part 405 determines whether there is another measurement-target captured pixel not used for the calculation of the measurement 3D coordinates (S205). When another measurement-target captured pixel not used for the calculation of the measurement 3D coordinates does not remain in the determination of step S205 (NO in S205), the geometry identification part 405 identifies the geometry of the object to be measured on the basis of the measurement 3D coordinates of the plurality of measurement points (S206). When there is another measurement-target captured pixel not used for the calculation the measurement 3D coordinates in step S205 (YES in S205), the geometry identification part 405 returns to the processing of step S202.

[Effect of the Present Invention]

In the 3D geometry measurement apparatus 100 of the present embodiment, the geometry identification part 405 corrects the coordinates of the plurality of measurement-target captured pixels included in the measurement-target captured image on the basis of (i) the function representing the geometric characteristics of the first capturing device 1 and (ii) the correction information for correcting the coordinates of the measurement-target captured pixel. Therefore, the geometry identification part 405 can highly accurately correct the image distortion that would be difficult to express with the function representing the geometric characteristics.

[Variation Example for Capturing a Reference Instrument Rotated about an Axis in the Depth Direction]

The reference coordinate identification part 401 may generate a plurality of reference captured images of the reference instrument 51 which is gradually rotated about an axis in the depth direction. The correction part 403 generates error images corresponding to these reference captured images. The synthesis part 404 may generate an error image which is the plurality of generated error images being averaged. In this manner, since the synthesis part 404 averages variations in coordinates of the feature points of the reference instrument 51 in the depth direction, the measurement accuracy can be further improved.

[Variation Example for Obtaining Correction Function]

Figure 14:
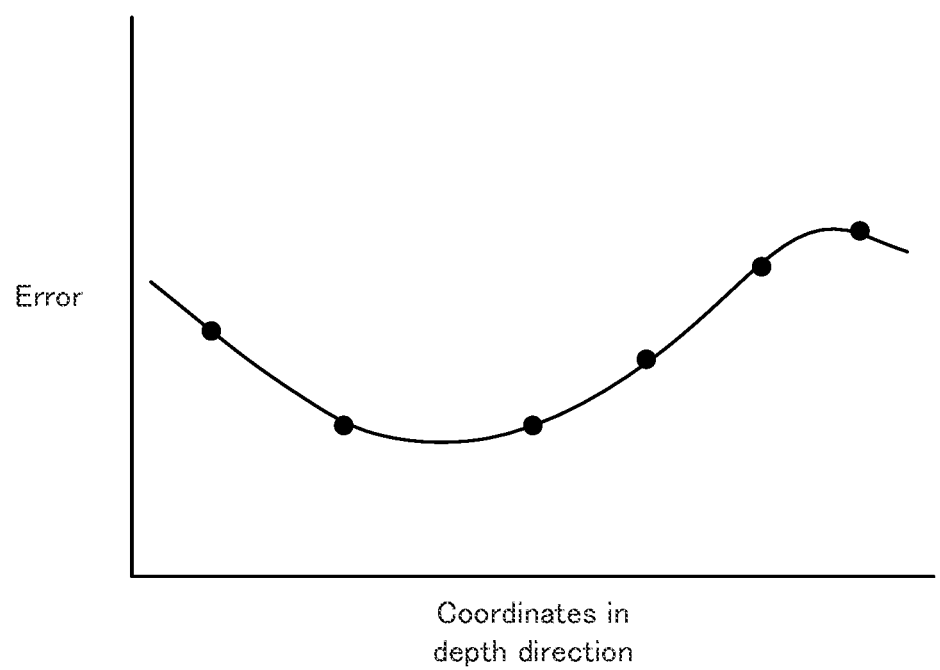
FIG. 14 shows a relationship between (i) coordinates in a depth direction and (ii) a lateral component of an error in coordinates of a particular reference captured pixel.

Using a plurality of error images, the correction part 403 may generate, for each captured pixel, a correction function for correction. FIG. 14 shows a relationship between (i) coordinates in the depth direction and (ii) a lateral component of an error in coordinates of a particular reference captured pixel. The horizontal axis of FIG. 14 indicates the coordinates in the depth direction at which the reference instrument 51 is installed. The vertical axis of FIG. 14 indicates the lateral component of the error in the coordinates of the particular captured pixel. A plurality of black circles in FIG. 14 indicate the distribution of lateral components of the error in the coordinates of the particular captured pixel.

The lateral components of the error in the coordinates of the captured pixel fluctuate in accordance with the coordinates in the depth direction. The correction part 403 may generate a correction function that matches the distribution of the black circles for the lateral components of the error in the coordinates of the captured pixel, as shown by a curved line in FIG. 14. For example, the correction part 403 generates a correction function that matches the distribution of the black circles of FIG. 14 using a known technique such as the least-squares method. The correction part 403 associates (i) the generated correction function, (ii) the vertical coordinates of the captured pixel, and (iii) the horizontal coordinates of the captured pixel with each other and stores them in the storage part 5. The correction part 403 generates a similar correction function for the longitudinal components of the error in the coordinates of the captured pixel.

The geometry identification part 405 references, instead of the error image, the correction function generated by the correction part 403 to correct the coordinates of the measurement-target captured pixel. Since the geometry identification part 405 can obtain the error of the coordinates of the measurement-target captured pixel corresponding to any coordinate in the depth direction by referencing the correction function, the image distortion can be corrected with higher accuracy.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present disclosure is obvious from the description of the claims.

What is claimed is:

1. A three-dimensional geometry measurement apparatus that includes a capturing device and measures a three-dimensional geometry of an object to be measured on the basis of a measurement-target captured image obtained by capturing the object to be measured with the capturing device, the three-dimensional geometry measurement apparatus comprising:

a reference coordinate identification part that identifies coordinates of a reference captured pixel corresponding to a feature point in a reference captured image generated by capturing, with the capturing device, a reference instrument having a plurality of the feature points whose two-dimensional coordinates or three-dimensional coordinates are known in advance;

a virtual coordinate identification part that identifies coordinates of a virtual captured pixel corresponding to the feature point in an image plane of the capturing device by virtually projecting the feature point on the reference instrument onto the image plane using (i) geometric property information indicating geometric characteristics of the capturing devices and (ii) relative position and posture information between the capturing device and the reference instrument;

a correction part that generates correction information for correcting coordinates of the measurement-target captured pixel included in the measurement-target captured image on the basis of a comparison between the coordinates of the reference captured pixel and the coordinates of the virtual captured pixel; and a geometry identification part that corrects coordinates of a plurality of the measurement-target captured pixels included in the measurement-target captured image generated by capturing the object to be measured with the capturing device on the basis of the geometric property information and the correction information, and identifies a geometry of the object to be measured on the basis of measurement three-dimensional coordinates to be calculated based on the coordinates of the measurement-target captured pixels.

2. The three-dimensional geometry measurement apparatus according to claim 1, wherein the geometric property information of the capturing device includes at least one of a function using a coefficient for a distortion in a radial direction of an optical element or a function using a coefficient for a distortion in a circumferential direction of the optical element.

3. A three-dimensional geometry measurement apparatus that includes a capturing device and measures a three-dimensional geometry of an object to be measured on the basis of a measurement-target captured image obtained by capturing the object to be measured with the capturing device, the three-dimensional geometry measurement apparatus comprising:

a reference coordinate identification part that identifies coordinates of a reference captured pixel corresponding to a feature point in a reference captured image generated by capturing a reference instrument having a plurality of the feature points with the capturing device;

a virtual coordinate identification part that identifies coordinates of a virtual captured pixel corresponding to the feature point in an image plane of the capturing device by virtually projecting the feature point on the reference instrument onto the image plane using (i) geometric property information indicating geometric characteristics of the capturing devices and (ii) relative position and posture information between the capturing device and the reference instrument;

a correction part that generates correction information for correcting coordinates of the measurement-target captured pixel included in the measurement-target captured image on the basis of a comparison between the coordinates of the reference captured pixel and the coordinates of the virtual captured pixel; and a geometry identification part that corrects coordinates of a plurality of the measurement-target captured pixels included in the measurement-target captured image generated by capturing the object to be measured with the capturing device on the basis of the geometric property information and the correction information, and identifies a geometry of the object to be measured on the basis of measurement three-dimensional coordinates to be calculated based on the coordinates of the measurement-target captured pixels, wherein the correction part identifies an error between the coordinates of the virtual captured pixel and the coordinates of the reference captured pixel, the correction part generates an error image in which the identified error is associated with coordinates of a pixel that corresponds to the identified error, and the geometry identification part corrects coordinates of the measurement-target captured pixel on the basis of the error associated with coordinates of a pixel corresponding to the measurement-target captured pixel in the error image, and calculates the measurement three-dimensional coordinates on the basis of the corrected coordinates.

4. The three-dimensional geometry measurement apparatus according to claim 3, wherein the correction part estimates an error of the pixel with which the error is not associated on the basis of a plurality of the errors of a plurality of the reference captured pixels associated with coordinates which are different from the coordinates of the pixel with which the error is not associated, and generates the error image by associating the coordinates of the pixel corresponding to the estimated error with the estimated error.

5. The three-dimensional geometry measurement apparatus according to claim 3, wherein the correction part generates a plurality of the error images corresponding to a plurality of the reference captured images generated by capturing the reference instrument in a state in which the reference instrument is installed at a plurality of positions and postures with the capturing devices, and the apparatus further comprises a synthesis part that generates one or more averaged error images by averaging (i) an error associated with the measurement-target captured pixel in one of the error images and (ii) an error associated with the same measurement-target captured pixel in another error image.

6. The three-dimensional geometry measurement apparatus according to claim 5, wherein the correction part generates the error images corresponding to the plurality of reference captured images of the reference instrument which is gradually rotated about an axis in a depth direction.

7. The three-dimensional geometry measurement apparatus according to claim 3, wherein the geometry identification part obtains an approximate value of measurement three-dimensional coordinates corresponding to the measurement-target captured pixel included in the measurement-target captured image, and calculates the measurement three-dimensional coordinates on the basis of an error identified by using (i) a plurality of the error images, (ii) coordinates in a depth direction of positions of the reference instrument corresponding to the error images, and (iii) a coordinate in a depth direction of the approximate value.

8. The three-dimensional geometry measurement apparatus according to claim 1, further comprising a projection device that projects a projection image, wherein the image capturing device generates the measurement-target captured image by capturing the object to be measured onto which the projection image is projected.

9. A three-dimensional geometry measurement method for measuring a three-dimensional geometry of an object to be measured on the basis of a measurement-target captured image obtained by capturing the object to be measured with a capturing device, comprising:

identifying coordinates of a reference captured pixel corresponding to a feature point in the reference captured image generated by capturing, with the capturing device, a reference instrument having a plurality of the feature points whose two-dimensional coordinates or three-dimensional coordinates are known in advance;

identifying coordinates of a virtual captured pixel corresponding to the feature point in an image plane of the capturing device by virtually projecting the feature point on the reference instrument onto the image plane using (i) geometric property information indicating geometric characteristics of the capturing devices and (ii) relative position and posture information between the capturing devices and the reference instrument;

generating correction information for correcting coordinates of the measurement-target captured pixel included in the measurement-target captured image on the basis of a comparison between the coordinates of the reference captured pixel and the coordinates of the virtual captured pixel; and correcting coordinates of a plurality of the measurement-target captured pixels included in the measurement-target captured image generated by capturing the object to be measured with the capturing device on the basis of the geometric property information and the correction information to identify a geometry of the object to be measured on the basis of measurement three-dimensional coordinates to be calculated based on the coordinates of the measurement-target captured pixels.

* * * * *